United States Patent
De Smet

(10) Patent No.: US 6,321,137 B1
(45) Date of Patent: Nov. 20, 2001

(54) METHOD FOR CALIBRATION OF A ROBOT INSPECTION SYSTEM

(75) Inventor: Pierre De Smet, Bloomfield Hills, MI (US)

(73) Assignee: Dynalog, Inc., Bloomfield Hills, MI (US)

( * ) Notice: Subject to any disclaimer, the term of this patent is extended or adjusted under 35 U.S.C. 154(b) by 0 days.

(21) Appl. No.: 09/423,120
(22) PCT Filed: Sep. 4, 1998
(86) PCT No.: PCT/US98/18559
  § 371 Date: Feb. 15, 2000
  § 102(e) Date: Feb. 15, 2000
(87) PCT Pub. No.: WO99/12082
  PCT Pub. Date: Mar. 11, 1999

Related U.S. Application Data

(60) Provisional application No. 60/057,505, filed on Sep. 4, 1997, and provisional application No. 60/088,344, filed on Jun. 6, 1998.

(51) Int. Cl.[7] ................................................. G06F 19/00
(52) U.S. Cl. ................ 700/245; 700/246; 700/247; 700/248; 700/250; 700/252; 700/253; 700/255; 700/257; 700/259; 700/260; 700/263; 700/264; 900/31; 900/47; 29/490.04; 29/139.03
(58) Field of Search ............................... 700/245, 248, 700/259, 252, 253, 250, 260, 246, 247, 257, 263, 86, 255, 264, 900, 64; 900/31, 47; 356/375, 400; 29/407.04, 139.03

(56) References Cited

U.S. PATENT DOCUMENTS

| | | | |
|---|---|---|---|
| 4,727,471 | 2/1988 | Driels et al. | 700/66 |
| 4,753,569 * | 6/1988 | Pryor | 700/250 |
| 4,842,475 | 6/1989 | Driels | 414/730 |
| 5,148,591 * | 9/1992 | Pryor | 29/407.04 |
| 5,297,238 | 3/1994 | Wang et al. | 395/94 |
| 5,400,638 | 3/1995 | Kim | 73/1.79 |
| 5,506,682 * | 4/1996 | Pryor | 356/375 |
| 5,602,967 * | 2/1997 | Pryor | 700/259 |
| 5,608,847 * | 3/1997 | Pryor | 700/248 |
| 5,910,719 | 6/1999 | Thorne | 318/560 |

FOREIGN PATENT DOCUMENTS

WO 99/36216    7/1999   (WO).

OTHER PUBLICATIONS

Automated Partial Pose Measurement System for Manipulator Calibration Experiments, Morris R. Driels, Member, IEEE, and William E. Swayze.

Simultaneous Calibration of a Robot and a Hand–Mounted Camera, Hanqi Zhuang, Senior Member, IEEE, Kuanchih Wang, Member IEEE, and Zvi S. Roth, Senior Member IEEE.

Global Calibration of a Robot Vision System, G.V. Puskorius and L.A. Feldkamp.

A New Technique for Fully Autonomous and Efficient 3D Robotics Hand/Eye Calibration, Roger Y. Tsai and Reimar K. Lenz.

(List continued on next page.)

Primary Examiner—William A. Cuchlinski, Jr.
Assistant Examiner—McDieunel Marc
(74) Attorney, Agent, or Firm—Gifford, Krass, Groh, Sprinkle, Anderson & Citkowski, P.C.

(57) ABSTRACT

A system for calibrating a robot used for inspecting a workpiece to maintain the accuracy of the robot during inspection of workpieces on a production basis, the system including means for storing a mathematical model of the robot, means for measuring the position of a target and then calibrating the robot based upon input from the mathematical model and the position of the target.

11 Claims, 2 Drawing Sheets

OTHER PUBLICATIONS

Autonomous Robot Calibration for Hand–Eye Coordination, David J. Bennett, Davi Geiger, John M. Hollerbach.
Hanqi Zhuang and Zvi S. Roth—Department of Electrical Engineering Florida Atlantic University Boca Raton, Florida, CRC Press—Camera–aided Robot Calibration.
Chapter 4—Pose Measurement with Cameras, 14 pages.
Chapter 7—Simultaneous Calibration of a Robot and a Hand–Mounted Camera, 9 pages.
Zhuang et al., Camera–assisted calibration of SCARA arms Intelligent Robots and Systems 95. 'Human Robot Interaction and Cooperative Robots', Proceedings. IEEE/RSJ International Conference on vol.: 1, pp. 507–512 vol. 1, 1995.*

* cited by examiner

METHOD FOR CALIBRATION OF A ROBOT INSPECTION SYSTEM

CROSS-REFERENCE TO RELATED APPLICATION

This application is based upon Provisional Application No. 60/057,505 filed on Sep. 4, 1997 and on Provisional Application No. 60/088,344 filed on Jun. 6, 1998.

BACKGROUND OF THE INVENTION

I. Field of the Invention

The present invention relates generally to robot calibration and more particularly to use of robot calibration to maximize absolute accuracy and repeatability of a robot-based measurement system.

II. Description of the Related Art

Within the general field of measurement/part inspection technology lies the technology related to devices known as coordinate measuring machines (CMMs). Manufacturing companies of any sort who desire to perform measurement of objects with a high level of accuracy have typically employed coordinate measurement machines to complete such tasks. A typical coordinate measuring machine consists of a three-axis machine with a touch probe mounted on a heavy, machined surface. The coordinate measurement machine generally further includes a controller which can be used to drive the touch probe until the touch probe makes contact with a surface on an object (generally referred to as "manual" teaching of the measurement positions). In the course of performing the measurement task, the controller displays and records the position of the touch probe at a plurality of locations on the object being measured.

Recently, as a result of the expense and limitations upon speed of the measurement process inherent to coordinate measurement machine technology, end users have begun to investigate use of less expensive, fast-moving industrial robots to carry measurement devices in order to collect measurement data faster allowing measurement of a larger number of objects. Furthermore, the fact that industrial robots are manufactured in large volumes alone insures that such "robot inspection systems" offer the opportunity to collect measurement data at a much lower cost per measured object than traditional coordinate measurement machine technology when used in applications which require less accuracy than traditional coordinate measurement machine technology.

The essential element of a robot inspection system is the use of the robot to position a measurement device in a location where a feature of interest (e.g. hole, edge, surface, etc.) is within the field of view or range of the measurement device itself. Typically, robot inspection systems employ a three dimensional sensor carried by the robot. Such three dimensional sensors may involve use of a variety of measurement technology including but not limited to cameras, lasers, combinations of cameras and lasers, and others. However, in applications such as surface inspection, a robot inspection system may employ devices which provide measurements in "less" than three dimensions. An example of one such known measurement device is use of the Perceptron Contour Sensor for two-dimensional measurement of objects. The Perceptron contour sensor comprises a sensor and illumination source positioned at an angle relative to one another within a housing. The illumination source, typically a laser light source, generates a plane of laser light normal to the light source, such as a prism or by other means. The plane of light from the light source produces a line on the surface of the object. The sensor, typically a Charge Coupled Device (CCD) camera, views the surface of the object at an angle relative to the plane of light generated by the laser light source. Optical filters are then utilized so that the CCD camera is sensitive to the particular wavelengths generated by the laser. Because the camera is viewing the surface of the object at an angle relative to the laser, the contour of the surface of the object results in a shaped line which is measured by the camera. These laser and camera systems are also utilized to measure the contours of the surfaces or measure gaps between two adjacent objects, such as components of a vehicle.

Irrespective of the type of measurement device employed by the robot inspection system, the principal benefits of using robots when attempting to perform measurement tasks are that: (1) industrial robots are manufactured in large volumes, (2) thus can be produced at a potentially lower cost per measurement volume, (3) the systems typically involve "non-contact" measurement devices, (4) the operator may position the measurement device using six degrees of freedom rather than three degrees of freedom typically offered by coordinate measuring machines, (5) the movement between measurement positions is at a much higher rate of speed, and (6) modern industrial robots routinely achieve position repeatability of better than 0.100 mm.

The principal problem with using robot inspection systems lies in the fact that although industrial robots are designed and manufactured to be "repeatable" in a specific set of conditions, they typically are not manufactured to achieve "absolute accuracy" and, further, are not designed to produce constant repeatability over time under different sets of conditions. Repeatability is defined as the robot's ability to return to the same positions in space when executing a particular robot program many times. In contrast, absolute accuracy is defined as the robot's ability to achieve a desired position in space using commanded coordinates, for example, in three dimensional space. Historically, robot manufacturers have focused on improving robot repeatability as each robot program was initially taught by an operator driving the robot to desired locations in space and simply recording it, no matter what values/coordinates were assigned to that position by the robot controller—based on the controller's calculation of the values/coordinates for the position using "nominal" dimensions of the robot type. In applications such as robot inspection systems where the position of the robot is used to identify the location of features on the measured object (i.e. holes, edges, surfaces), end users seek absolute accuracy of the robot position as well as repeatability. Factors such as tolerances in the manufacturing and assembly of robot components, deflection due to the effects of gravity, and other variations between an actual robot and the "nominal robot" used by the robot controller to calculate positions in three dimensional space, cause the industrial robot to achieve actual positions which vary from the desired positions (i.e. 998.135, 1002.723, 999.052 rather than 1000, 1000, 1000 position in three dimensional space). As a result of these issues of "absolute accuracy", the current use of robot inspection systems has been limited to "process variation" (i.e. the identification of direction of trends in dimensions of measured objects rather than the coordinate measuring machine capability of identifying the magnitude of variation between a particular measured object and its nominal dimensions), assuming that environmental conditions such as ambient temperature do not change. In the case of change in ambient temperature, for example, the size of robot components will change according to the thermal coefficient of the material from which the component was formed, so even the task of "process variation is compromised in real-world applications.

Attempts to solve the issue of absolute accuracy and process variation for robot inspection system applications have included: (1) use of a sensor in combination with an external measurement system, such as use of Steinbichler's COMET device together with Nothern Digital's Optotrack, to directly track the actual position achieved by the robot and its measurement devices in three-dimensional space, rather than relying on the position reported by the robot controller (effectively just using the robot just as a carrying device) at each robot position in the production measurement program; and (2) periodic "off-line" calibration of the of the robot inspection system using an external measurement system ("external calibration") such as Dynalog's DynaCal Robot Cell Calibration System or any other similar technique. The method utilizing an external measurement device to identify the actual position of the measurement device mounted on the robot carries fundamental and practical problems including: (1) a relatively low level of accuracy which such external systems can achieve throughout the working envelope of a standard industrial robot; and (2) the high purchase price of such an external measurement system easily eliminates any cost savings and reliability benefits in the use of a robot rather than traditional coordinate measuring machine technology.

An additional problem with the technique of using an external measurement system is the fact that the "tool center point" (TCP) of the measurement device mounted on the robot is not a "physical" one and therefore does not automatically correspond directly with the point of interest of the external measurement system. Furthermore, such individual "on-line" techniques typically do not identify the location of the fixtures (the structure that holds the object to be measured) relative to the robot's base frame directly. Finally, techniques involving external calibration of individual components do not facilitate automatic, periodic re-calibration "on line" (i.e. without operator intervention) to identify changes in robot and tool center point of the measurement device (for example changes due to fluctuations in ambient temperature).

SUMMARY OF THE INVENTION

An object of the present invention is to provide a method for calibrating the components of a robot inspection system in a single step using measurement data collected by the measurement device mounted on the robot. This method for calibration maximizes the positional accuracy and repeatability over time of the robot inspection system when functioning in a manner similar to a traditional coordinate measuring machine. The principal feature of the present invention is that the Measurement Device of the robot inspection system itself provides the data employed in the calibration process. As a result, the robot's Tool Center Point (TCP) can intrinsically be made to coincide with the true focal point of the measurement device during the calibration process. Consequently, by employing "calibration targets" at known locations in the measurement envelope, the present invention automatic identification of "as built" parameters of all three components of the robot inspection system (i.e. the robot, the measurement device, and the location of the fixture holding the measured object relative to the robot's base frame).

The calibration method of the present invention not only includes the Identification aspect of the differences ("calibration parameters") between the actual robot, measurement device and fixture and their respective nominal parameters, it also includes the necessary compensation aspect. The preferred embodiment of the invention, as described below, allows the end-user to choose between at least two alternate methods for compensation, either to modify: (1) the original measurement robot program(s) to position the measurement device at the desired locations with extreme precision, or (2) to modify the measurement data collected after executing the original, "unfiltered," measurement robot program(s) to compensate for the effect of errors in robot position upon the measurement data.

The calibration method of the present invention can be executed (i.e. both the Identification and Compensation aspects) periodically and automatically between production cycles of the robotic coordinate measuring machine. This aspect of the present invention provides the additional benefit of "on-line" verification of the overall position accuracy of the robot inspection system including identification of changes in the "as built" parameters. The Identification aspect of the present calibration method applies to differences between the "as built" parameters and the nominal ones; as well as to the "as built" parameters that change over time (due to environmental factors such as temperature or due to wear, etc.) and thus affect the robot inspection system's repeatability.

More specifically, the object of the present invention is to provide an apparatus for calibrating the robot inspection system using a variety of measurement devices, whether that device provides measurement in one dimension or more than one dimension where the measurement device acts as both production tool and calibration data acquisition device. In one of the preferred embodiments of the present invention, a laser camera yields 2-dimensional data and accurate measurement of surfaces and contours. This preferred embodiment utilizes a specific target which allows the determination of specific points related to that contour. A feature of this preferred embodiment is that the measurement of distances to one target taken from two perspectives will result in the determination of one unique point. This embodiment exemplifies the fact that the overall calibration method of the present invention is independent of the amount of degrees of freedom of the measurement device; for example, the use of a typical 3-dimensional measurement device is not required.

Further features and advantages of the invention will be apparent from the description below.

DESCRIPTION OF THE PREFERRED EMBODIMENTS

Figure 1:
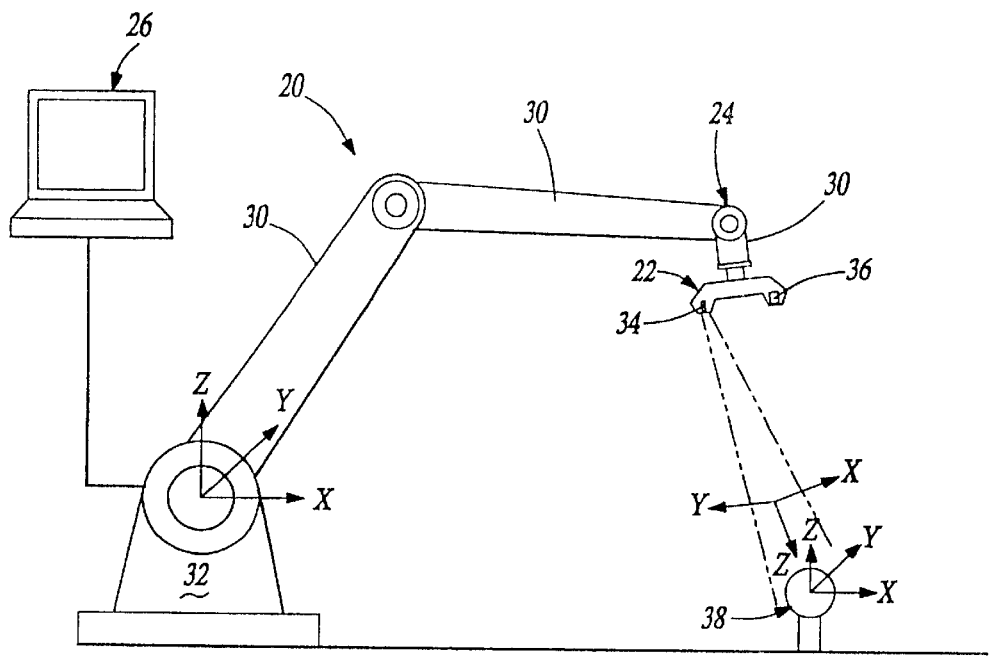
FIG. 1 is a side view of a first preferred embodiment.

The method and devices of the present invention will be described in conjunction with the drawings. It will be understood, however, that the method of the present invention will have applications in other areas of manufacturing and that the description of the present invention with respect to the described embodiments is by way of example only.

The primary embodiment of the current invention consists of a method which involves a series of steps which will be described in the following paragraphs. In the first step of the preferred embodiment one or more calibration targets will be located within the measurement envelope. In the preferred embodiments, the location of these targets should, to the extent possible "encompass" the measurement envelope of the robot inspection system. Therefore, preferably the locations of the calibration targets should not be co-linear and further "encompass" a relatively large volume which surrounds the object to be measured.

The location of the calibration targets, each one relative to the other (i.e. known and expressed in one common but arbitrary coordinate frame) although not required (except for the purposes described in the following paragraph) minimizes the number of robot positions required in the calibration robot program (thus reducing the number of calibration targets required and the number of different robot orientations at each of the calibration targets, and increasing the resulting accuracy of the robot inspection system following calibration).

The location of the calibration targets needs to be known and expressed in the coordinate frame of the fixture only if the operator intends to perform off line programming (OLP) of the robot inspection system. OLP of the robot inspection system involves creation of a measurement robot program through CAD information and computer simulation. In these cases where OLP of the robot inspection system is intended, the collected measurement data that truly and directly represents the absolutely accuracy of the object being measured.

The second step involves the creation of a calibration robot program. The program is designed to cause the robot and the attached measurement device to move into proximity of each one of the calibration targets, with a plurality of robot configurations in such a manner that all of the robot's axes are exercised to as great an extent as possible. At each position commanded in the calibration robot program, the measurement device must read and record a measurement of the location of the corresponding calibration target. In this preferred embodiment, the calibration robot program should contain a sufficient number of robot positions to create at least as many measurement equations as calibration parameters that are identified (e.g. one 3D measurement produces three equations one 2D measurement produces two equations, etc.).

The third step of the method of the preferred embodiment involves the execution of the calibration robot program created in the second step. The program is executed and the measurements of the respective calibration targets at each robot position commanded in the calibration robot program are recorded by the measurement device. The measurements are expressed (either directly or indirectly through standard six degree of freedom frame transformation ) in the coordinate frame of the measurement device, which corresponds with the robot's TCP.

The fourth step of the preferred embodiment may take one of two paths. The first path being to calibrate for absolute accuracy of the robot inspection system, the second path being for calibration for repeatability over time of the robot coordinate measurement machine system.

The first path of the fourth step is calibration for absolute accuracy of the robot inspection system. The software is executed to identify the robot inspection system parameters (i.e. calibration parameters of all three components of the robot inspection system including robot related parameters, tool center point (TCP) and fixture location) as necessary to maximize the absolute accuracy of the robot inspection system by minimizing the absolute accuracy residuals. The robot related parameters may include but are not limited to: Geometric parameters such as the Denavit-Hartenberg parameters and non-geometric parameters such as compliance. In this preferred embodiment a relatively large number of calibration parameters must be identified, therefore requiring the use of several calibration targets within the robot inspection system and/or the use of robot positions in the robot calibration program which involves a large number of different robot orientations around the calibration targets.

The alternate path through step four is executed when calibrating for repeatability over time of the robot inspection system. In this embodiment the calibration software is executed to identify the robot inspection system parameters (i.e. calibration parameters of all three components of the robot inspection system including robot related parameters, tool center point (TCP) and fixture location) as necessary to maximize the repeatability of robot positions by minimizing the difference between the residuals of the first time calibration and those of the present calibration. Only the calibration parameters that are susceptible to affect repeatability (i.e. change over time: link lengths are affected by temperature, axis offsets drift because of wear, etc.) need to be identified in this case, requiring less calibration targets and/or less robot orientations around each one of these targets.

The fifth step of this preferred embodiment enables the operator to choose between at least two different options for using the parameter information identified in the calibration process to perform compensation for said parameter information. The potential options within step five include compensation for measurement robot program and compensation or measurement data.

In the first option for step five of the preferred embodiment, the identified robot inspection system parameters are used to correct the original measurement robot program in an effort to drive the robot to the nominal locations originally intended. This option produces robot inspection system measurement data that do not require further modification or compensation (for example, the measurement data can be used "as is" for analysis of the production of parts).

In the second option for step five of the preferred embodiment, compensation of measurement data, the measurement robot program is used in conjunction with the identified robot inspection system parameters to correct the collected measurement data for the difference between the originally intended, nominal robot positions, and the position actually achieved by a particular robot with "as built" differences from the nominal robot.

Application of this preferred embodiment on a particular measurement device (ie. the two dimensional contour sensor provided by Perceptron) is now described. With reference now to FIG. 1, a calibration system 20 is shown. A measurement device 22 is mounted on the end of the robot arm 24. Both the measurement device 22 and the robot arm 24 are controlled by computer 26. The computer 26 also receives the image information from the measurement device 22. It should be apparent to one skilled in the art that separate computers could be used to operate the robot arm 24, the measurement device 22 and perform the calibrations as will be described below.

The robot arm 24 generally comprises a plurality of hingeably and/or rotatably connected links 30 and is secured to a fixed base 32. The measurement device is preferably of the type including a light source 34, preferably a laser 34, but not limited to laser devices, generating a plane of light generally perpendicular to the laser 34. The measurement device 22 further includes a camera 36 mounted at an angle with respect to the laser 34 and the plane of light generated thereby. The camera 36 is preferably a CCD camera and is preferably "tuned" to be most sensitive to the wavelength of light generated by the laser 34. A preferred measurement device 22 of the type described is available commercially from Perceptron Inc. of Plymouth, Mich. Generally the laser 34 projects a line onto a surface to be measured. The CCD camera 36, viewing the surface at an angle relative to the laser 34, measures the shape of the line on the surface and thus, the surface. The measurement device 22 is utilized to measure contours on surfaces, including gaps between assembled components, particularly vehicle components, but not limited to vehicle components.

The calibration system 20 of the present invention utilizes the existing measurement device 22 which is mounted on the end of the robot arm 24, the existing computer program 26 which controls and receives information from the measurement device 22 and robot arm 24, and a target 38 of a known shape, preferably a sphere 38, in order to calibrate the parameters of the robot arm. One skilled in the art will understand that the target need only be of a shape which has been previously defined. In this preferred embodiment the target 38 is a sphere of a known radius R. The target 38 is placed at an arbitrary location within the working envelope of the robot arm 24 and measurement device 22. The only limitation on the placement of the target 38 within the working envelope of the robot arm 24 is that the robot arm 24 be able to move the measurement device 22 in a plurality (preferably more than ten) different locations or orientations in which it can still view the target 38. The number of measurements required in this preferred embodiment depends upon the number of parameters to be calibrated.

Figure 2:
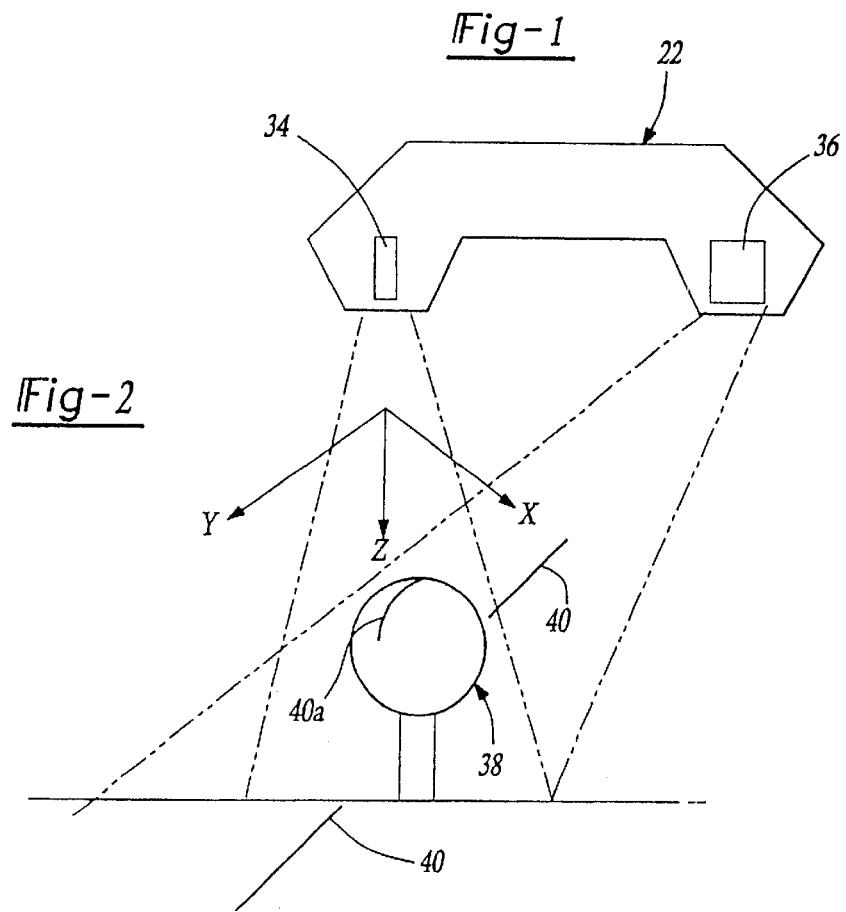
FIG. 2 is a side close up view of a first preferred embodiment.
Figure 3:
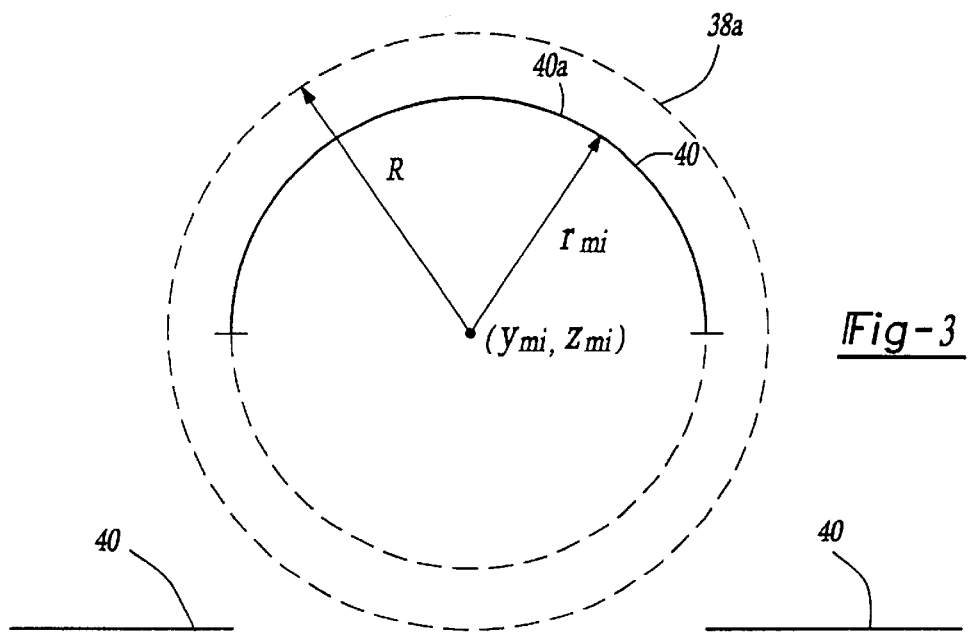
FIG. 3 is a side cross-sectional view of target 38 taken along the axis 40.

The computer 26 is programmed to control the robot arm 24 to move the measurement device 22 to a plurality of orientations and locations. Preferably, these different locations and orientations fully exercise the different parameters of the robot 24 (i.e., different angles among each of the adjacent pair of links 30). At each measurement point, the laser 34 projects a line 40 onto the target 38 as can be seen in FIG. 2. The CCD camera 36 stores an image of the line 40, shown in FIG. 3, which appears to the CCD camera 36 as a discontinuous line 40 including an arc 40a corresponding to a contour of the target 38. The computer 26 calculates the center (ymi, zmi) of the arc 40a and the radius rmi. Since the line 40 may not have been drawn across the center of the target 38, the calculated radius of this arc (rmi) might be smaller than the target's 38 known radius R. For reference, the outer surface of the target 38a across its center is shown in phantom in FIG. 3.

Figure 4:
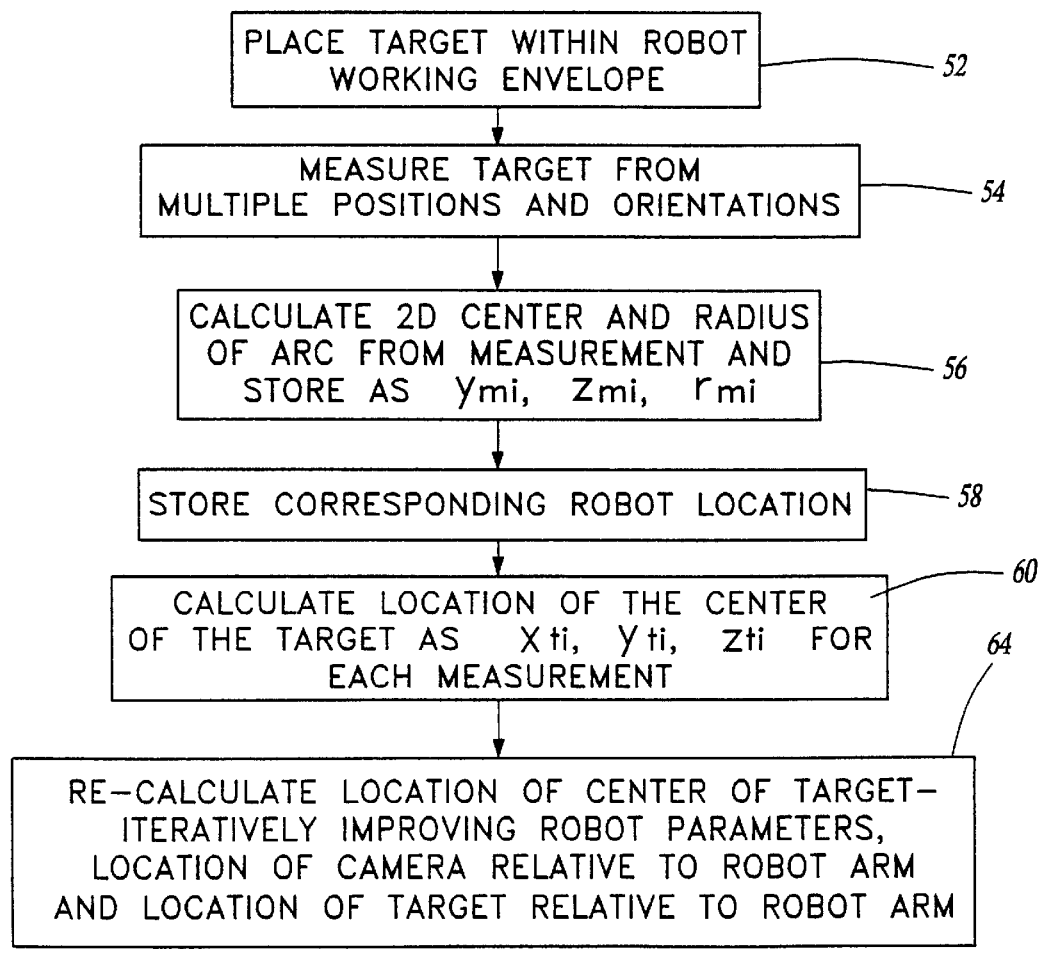
FIG. 4 is a flow chart of a method of the preferred embodiment.

A flow chart 50 illustrating the method of the present invention is shown in FIG. 4. In the following discussion of this preferred embodiment, the steps referenced are found in the flow chart 50 and reference the preferred embodiment shown in FIGS. 1–4. In step 52, the target 38 is placed within the robot working envelope as described above. The target 38 is then measured by the measurement device 22 from multiple positions and orientations in step 54. In step 56, the two-dimensional center and radius of the arc from each measurement is calculated and stored in ymi, zmi and rmi expressed in the referenced frame of the measurement device 22. In step 58, the corresponding robot location for each of the calculated two-dimensional centers and radii (ymi, zmi, rmi) is stored. These robot locations (the end of the robot arm 24 expressed in the reference frame of the robot base 32) are expressed either directly in "joint" format (j1i, j2i, j3i . . . jni, for n number of links), or in "Cartesian" format with "configuration" in which case it needs to be converted to "joint" format through inverse kinematics, depending upon the specific robot interface.

In step 60, the location of the center of the target 38 is calculated for each measurement location from the stored robot locations and stored as xti, yti, zti, in the reference frame of the robot base 32. It should be recognized that although the first measurement may generate two possible centers, i.e. on either side of the measured line 40, this will quickly be resolved by the second or third measurement. The location of the center of the target 38, as calculated based upon each of the measurements, will be different. This is caused by the fact that the actual parameters of the robot 24 (such as the length of the links 30) differ from the ideal, the location of the measurement device relative to the end of the robot arm 24 differs from the ideal, and the lack of accuracy of the measurement device 22.

In step 64, starting with the approximate values of the robot's parameters and assuming the accuracy of the measurement device 22, the center of the target 38 is repeatedly recalculated, iteratively improving the approximation of the Denavit-Hartenberg (D-H) robot parameters including the lengths of the links 30 and other parameters (e.g. mechanical flexibility, parallelogram geometry, etc.) until the deviation among the multiple calculations of the center of the target 38 from each of the measurements cannot be further reduced.

In step 66, the deviation among the multiple calculations of the center of the target 38 is tested. If the deviation cannot be reduced any further and the parameters are not experiencing further improvement (due to the margin of error of the measurement device 22 and possible parameters not considered), the robot 24 is calibrated. If, in step 66 the deviation has been reduced by the most recent iteration of the calculation, then the calculation is repeated in step 64. All of the parameters of the robot (the arm 24, the location of the camera 36 relative to the robot arm 24 and the location of the target 38 relative to the robot base 32) can be resolved by minimizing the following equation:

$$\text{Min}\left[\sum_{i=1}^{M}\left[\left(\sqrt{x_{ti}^2 + r_{mi}^2} - R\right)^2 + (y_{ti} - y_{mi})^2 + (z_{ti} - z_{mi})^2\right]\right]$$

Since the initial nominal values for the robot parameters are sufficiently close to the actual ones to be eventually identified, the above equation can be linearized based on differential changes of the transformation matrices. This linearized problem can be solved iteratively by applying the known singular value decomposition technique until no further improvement in the identified parameters is obtained. This will yield the actual parameters for the robot 24, the location of the camera 36 relative to the end of the robot arm 24, and the location of the target 38 relative to the robot base 32.

The calibration system and method of the present invention require no expensive external sensors and requires only a simple (although accurately formed) target 38. It should be apparent that the target 38 could be of any shape, however, a sphere is preferred in this embodiment. Further, it should be recognized that more than one target could also be placed within the working envelope of the robot 24 in order to more fully exercise different links 30 of the robot 24. Actually, in embodiments which identify the location of the fixture relative to the robot base frame, at least three different locations of such calibration targets are required and need to be known accurately with respect to the coordinate frame of the fixture. Calibration of the robot arm can be done on line, even between the inspection of assemblies. Thus, if the temperature changes during the course of operation, the robot arm 24 can be recalibrated in order to insure accurate operation.

The preferred embodiment as described above applies to use of a particular two dimensional measurement device. However it is clear that the use of other measurement devices—except for obvious items—will not deviate from the general procedure described above.

Indeed, use of a typical x, y, z measurement device (versus the two dimensional device described above) will actually somewhat simplify the overall procedure. Specifically, Step 5 and Step 6 of the flow chart on FIG. 4 can then be eliminated, since the measurement device directly yields the x, y, z location of the calibration target. In essence, the remainder of the procedure remains the same.

Having described my invention, however, many modifications, including but not limited to measurement devices, targets, computers, and robots thereto will become apparent to those of skill in the art to which it pertains without deviation from the spirit of the invention as defined by the scope of the appended claims.

I claim:

1. A system for calibrating a robot to be used for inspecting a workpiece said robot having a robot arm, said robot arm having an outer end, a camera and a laser light source mounted to said outer end of said robot arm for inspecting said workpiece, said system for calibrating said robot comprising:

said outer end of said robot arm being movable within a working envelope;

means for controlling the outer end of said robot to a plurality of positions within said working envelope;

said laser light source generating a plane of laser light normal to said laser light source;

said camera mounted on said outer end of said robot arm at an angle relative to said laser light source;

a target positioned within said working envelope;

said laser light source projecting said plane of laser light onto said target at each of said plurality of positions of said outer end of said robot arm, said camera generating a measurement of said target at each of said plurality of positions by viewing said projected laser light on said target;

means for storing a mathematical model of said robot; and means for calibrating the position of said robot arm based upon said mathematical model of said robot, of said target and said plurality of measurements by said camera of said projected laser light on said target.

2. A system for calibrating a robot to be used for inspecting a workpiece utilizing a robot arm, said robot arm having an outer end, a measurement device mounted to said outer end of said robot arm for inspecting said workpiece, said system for calibrating said robot comprising:

a target that can be measured by said measurement device;

means for controlling said robot arm to move said measurement device to take a measurement of said target at each of a plurality of locations and orientations;

means for storing a mathematical model of said robot; and means for calibrating said robot arm based upon said mathematical model of said robot, said target and said plurality of measurements.

3. The robot calibration system of claim 2 wherein said measurement device comprises a camera and a light source mounted at an angle relative to each other.

4. The system as defined in claim 2 and including at least two targets.

5. A method for calibrating a robot wherein said robot operates within an operating envelope and includes an end effector with an associated measurement device for inspecting a workpiece, said measurement device capable of determining position, the method of calibrating said robot comprising the steps of:

storing a mathematical model of said robot having a predetermined number of parameters, each of said parameters containing a nominal value that is calibrated through mathematical optimization as close as possible to its actual value;

positioning a target within said operating envelope;

storing a sequence of robot operations, wherein said operations are functional to place said end effector and associated measurement device in a measurable location with respect to said target, determine the position of said target and store the position of said target;

executing said stored sequence of robot operations; and calibrating said robot for absolute accuracy based on said sequence of said measured positions of said target and said mathematical model of said robot.

6. In the robot calibration method of claim 5, wherein said measurement device comprises a laser and a camera.

7. In a robot calibration system, where said robot operates within an operating envelope and includes an end effector with an associated measurement device for inspecting a workpiece said measurement device being capable of determining position, the system of calibrating said robot comprising:

means for storing a mathematical model of said robot having a predetermined number of parameters, each of said parameters containing a nominal value, that is calibrated through mathematical optimization as closely as possible to its actual value;

means for positioning a target within said operating envelope;

means for storing a sequence of robot operations, wherein said operations are functional to place said end effector and associated measurement device in a measurable location with respect to said target, determine the position of said target and store the position of said target;

means for executing said stored sequence of robot operations; and means for calibrating said robot for repeatability based on said calibration data structure and said mathematical model of said robot.

8. In the robot calibration system of claim 7, wherein said measurement device comprises a laser and a plurality camera.

9. A robot inspection system for inspecting a workpiece comprising:

a robot having an outer end movable within a working envelope;

means for controlling the robot to move said outer end of said robot to a plurality of positions within said working envelope;

a measurement device for inspecting said workpiece mounted on said outer end of said, the output of which can be manipulated to provide positional measurement data:

a target positioned within said working envelope;

a fixture, which holds said workpiece in a location within said working envelope of said robot;

means for calibrating said robot, the said measurement device, and the location of said fixture based upon measurements made by said measurement device at said target at each of a plurality of robot positions;

means for using the calibration information for said robot, said measurement device, and said location of the fixture to insure that said robot reaches as accurately as possible each commanded position at which inspection of said workpiece can be performed.

10. A method for calibrating a robot device, utilizing the system as defined in claim 9, wherein said robot, the location of the measurement device, and the location of the fixture are calibrated periodically between completion of production measurement tasks whereby the need for further compensation for the effects of wear, temperature and other environmental factors that can affect the repeatability of the robot inspection system over time is eliminated.

11. The system as defined in claim 9 and including at least two targets.

* * * * *